(12) United States Patent
Gale (10) Patent No.: US 10,104,969 B2
(45) Date of Patent: Oct. 23, 2018

(54) FURNITURE STRAP CLIP

(71) Applicant: Jonathan Gale, San Diego, CA (US)

(72) Inventor: Jonathan Gale, San Diego, CA (US)

( * ) Notice: Subject to any disclaimer, the term of this patent is extended or adjusted under 35 U.S.C. 154(b) by 0 days.

(21) Appl. No.: 15/409,259

(22) Filed: Jan. 18, 2017

(65) Prior Publication Data

US 2017/0354259 A1 Dec. 14, 2017

Related U.S. Application Data

(60) Provisional application No. 62/392,858, filed on Jun. 13, 2016.

(51) Int. Cl.
*A47C 7/22* (2006.01)
*F16B 2/00* (2006.01)
*F16B 2/24* (2006.01)

(52) U.S. Cl.
CPC ........... *A47C 7/22* (2013.01); *F16B 2/005* (2013.01); *F16B 2/245* (2013.01); *Y10S 160/15* (2013.01); *Y10T 24/4727* (2015.01); *Y10T 24/497* (2015.01)

(58) Field of Classification Search
CPC . Y10T 24/4727; Y10T 24/492; Y10T 24/493; Y10T 24/497; A47C 7/22; A47C 31/04; F16B 2/005; F16B 2/245; Y10S 160/15
See application file for complete search history.

(56) References Cited

U.S. PATENT DOCUMENTS

| | | | |
|---|---|---|---|
| 2,582,579 A * | 1/1952 | Bedford, Jr. ............. | A47C 4/30 24/198 |
| 2,861,318 A * | 11/1958 | Fernberg ................. | A47C 31/04 24/560 |
| 3,042,113 A * | 7/1962 | Kramer ................... | A47C 31/04 160/404 |
| 3,137,372 A * | 6/1964 | Nash ...................... | A47C 31/04 160/392 |
| 3,710,422 A * | 1/1973 | van Halteren ........... | A47C 4/30 160/404 |
| 3,752,209 A * | 8/1973 | Swanson ................. | A47C 4/06 160/327 |

* cited by examiner

*Primary Examiner* — Robert Sandy
(74) *Attorney, Agent, or Firm* — MU P.C.

(57) ABSTRACT

A furniture clip to attach to the ends of a webbing strap in a system of webbing for an article of furniture. The clip is provided with prongs to be inserted into a groove provided on the framework of the article of furniture. The clip is further provided with teeth to retain the strap, wherein the strap is inserted into the clip and a user clamps the clip onto the strap using a pair of pliers or a vice. When clamped onto a strap, the prongs of the clip protrude at a 45-degree or 90-degree angle. The angle may be modified to accommodate furniture which requires the prongs to protrude at angles other than 45 or 90 degrees.

10 Claims, 12 Drawing Sheets

“FURNITURE STRAP CLIP”

FURNITURE STRAP CLIP

CROSS-REFERENCE TO RELATED APPLICATION(S)

The present application claims priority to U.S. Provisional Patent Application No. 62/392,858 filed on Jun. 13, 2016, entitled "Furniture Strap Clip" the entire disclosure of which is incorporated by reference herein.

BACKGROUND OF THE INVENTION

1. Field of Invention

The present invention relates to the field of furniture clips, and more particularly to furniture clips designed to fit within a groove and retain elastic straps or webbing.

2. Description of Related Art

Articles of furniture which utilize webbing to support a user have been in production for many years, and are often associated with quality Danish Modern, or Mid-Century furniture. The webbing provides support while maintaining a high level of comfort. While seated, the webbing will give to the user's weight, providing a comfortable seating arrangement. Most webbing used in furniture has been rubberized to some degree, such that it maintains elasticity and will return to its original position when the user removes his or her weight from the chair or couch. The webbing arrangement, allows for the furniture to maintain comfort over many years of use.

Cheaper or lesser quality furniture will often be constructed by stretching multiple straps of a webbing system over the frame, then each strap of the webbing system will be retained by multiple staples, nails, or both which are fastened through the strap and into the framework. While this method may be acceptable, it can damage the frame, cause tearing in the straps, and may require removal of the staples and/or nails in the event an owner wishes to refurbish or replace the straps.

Furniture of higher quality often includes a groove, slot, or recess within the framework. This groove is adapted to retain a plurality of metal clips. Each metal clip is clamped onto an end of the webbing straps. The straps are stretched across the frame and the metal clips are inserted into the grooves to form the webbing system. This method does not require fasteners which damage the frame and integrity of the furniture.

However, the clips do not always fit easily within the grooves. Occasionally, spanners are required to increase the width of the groove, allowing the metal clips may fit properly. If the correct tool or technique is not used, improper spanning can lead to cracks or damage to the framework of the furniture.

Based on the foregoing, there is a need in the art for a means to easily create or replace a furniture strap webbing without damaging the furniture. What might be further desired is an improved clip, adapted to secure a stretched strap to a groove, which does not require the groove to be spanned.

SUMMARY OF THE INVENTION

The present invention is a furniture strap clip. In the preferred embodiment, the furniture strap clip has a first side with a plurality of teeth protruding towards the interior of the clip. The clip is further provided with a second side having a plurality of through holes. A strap of a furniture web system is placed into the interior of the clip and retained by clamping the first side of the clip into the second side such that the teeth extend through the strap and into the through holes.

In the embodiment, the clip is further provided with one or more prongs. Once the clip has been clamped to retain the strap, the prongs are to be inserted into a groove provided on the framework of an article of furniture. Multiple straps are provided, each having a clip on both ends, to create a webbing system.

In the preferred embodiment, the prongs of the furniture strap clip protrude at 45 or 90-degree angle after the clip is clamped onto a strap. The furniture strap clip is preferably comprised of galvanized steel.

In another embodiment of the present invention, the furniture strap clip is provided with a plurality of teeth. In the embodiment, the teeth are provided to retain a furniture strap by piercing through the strap. In the embodiment, the furniture strap clip is further provided with one or more prongs to be inserted into a groove provided on the framework of an article of furniture. The embodiment does not require the clip to be bent or clamped on to the strap.

In the embodiment, the prongs of the furniture strap clip protrude at 45 or 90-degree angle. The furniture strap clip is preferably comprised of galvanized steel.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-12, wherein like reference numerals refer to like elements.

In reference to FIGS. 1-5, an embodiment of the furniture strap clip is shown, comprising a body 1 having a first side 5 and second side 10 which form a generally V-shaped profile. The clip is comprised of one or more projections or teeth 15, which protrude into the interior of the clip from the first side 5 towards the second side 10. The second side of the clip is provided with one or more through holes 20 which align with the teeth 15.

The arrangement is provided, such that a strap inserted into the interior of the clip, between the first side 5 and the second side 10. After insertion of the strap, the clip can be clamped onto the strap using a pair of pliers or a vice, such that the first side 5 of the clip is bent towards the second side 10. The clamping will cause the teeth 15 to engage with the strap, and allow the strap to be retained by the clip.

In the preferred embodiment, the furniture strap clip is further provided with one or more prongs 25. The prongs 25 are provided to mate with the groove or recess provided on the framework of an article of furniture. In a preferred embodiment, the prongs 25 are placed at a 45-degree angle relative to the second side 10 of the clip. In another embodiment, the prongs 25 may reside at a 90-degree angle relative to the second side 10 of the clip, or any angle deemed appropriate by one skilled in the art. The arrangement, is provided such that when the clip is clamped, the angle of the prongs remains the same relative to the second side of the clip.

Figure 8:
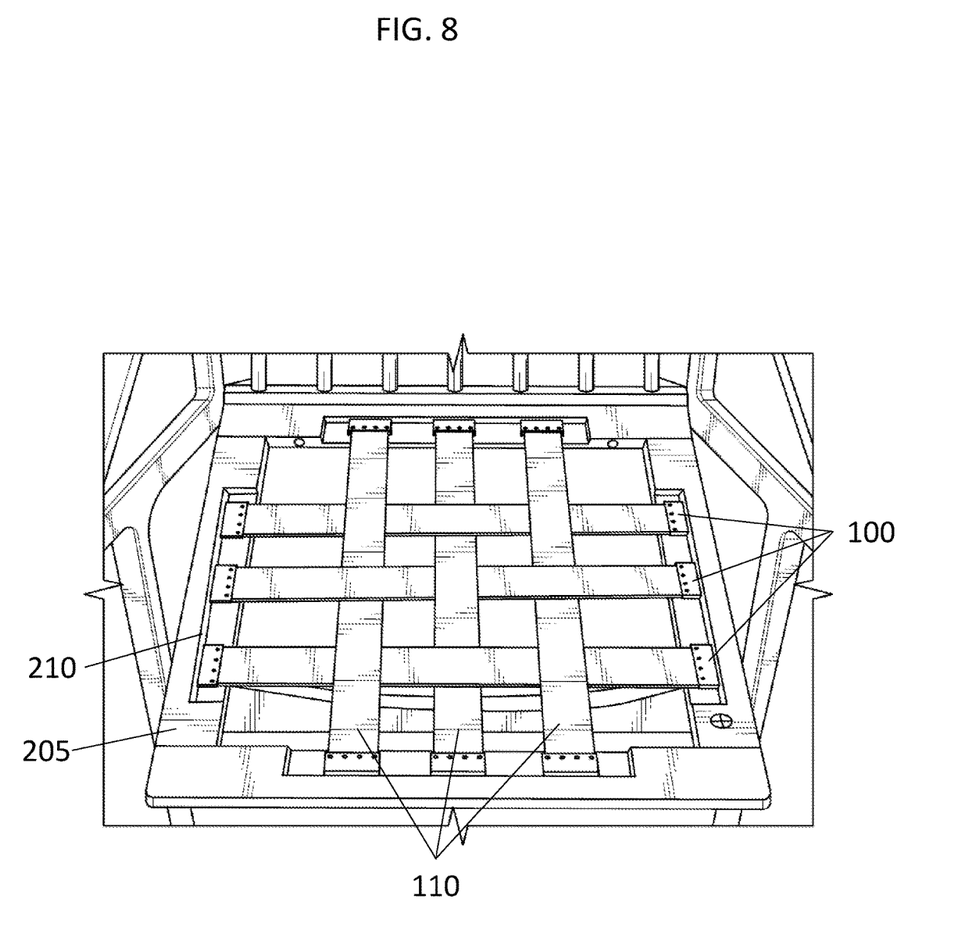
FIG. 8 is a perspective view of the furniture strap clip in use, according to an embodiment of the present invention.

In the preferred embodiment, the prongs 25 are inserted into a groove on one side of the frame work, and the prongs 25 of another clip clamped onto the other end of the strap are inserted into a groove on the opposite side of the framework. Multiple straps with clips are arranged to provide a webbing, as shown in FIG. 8, which can support the weight of a user who sits upon the article of furniture.

In the preferred embodiment, the furniture strap clip measures 5 centimeters (cm) in length and 2.2 cm in width, when the clip has been bent to retain a strap. In the preferred embodiment, the clip is provided with two prongs 25, each prong is 1.5 cm wide and there is a 1 cm gap between each prong. In the embodiment, the prongs are positioned 0.5 cm from the lengthwise ends of the clip.

Figure 1:
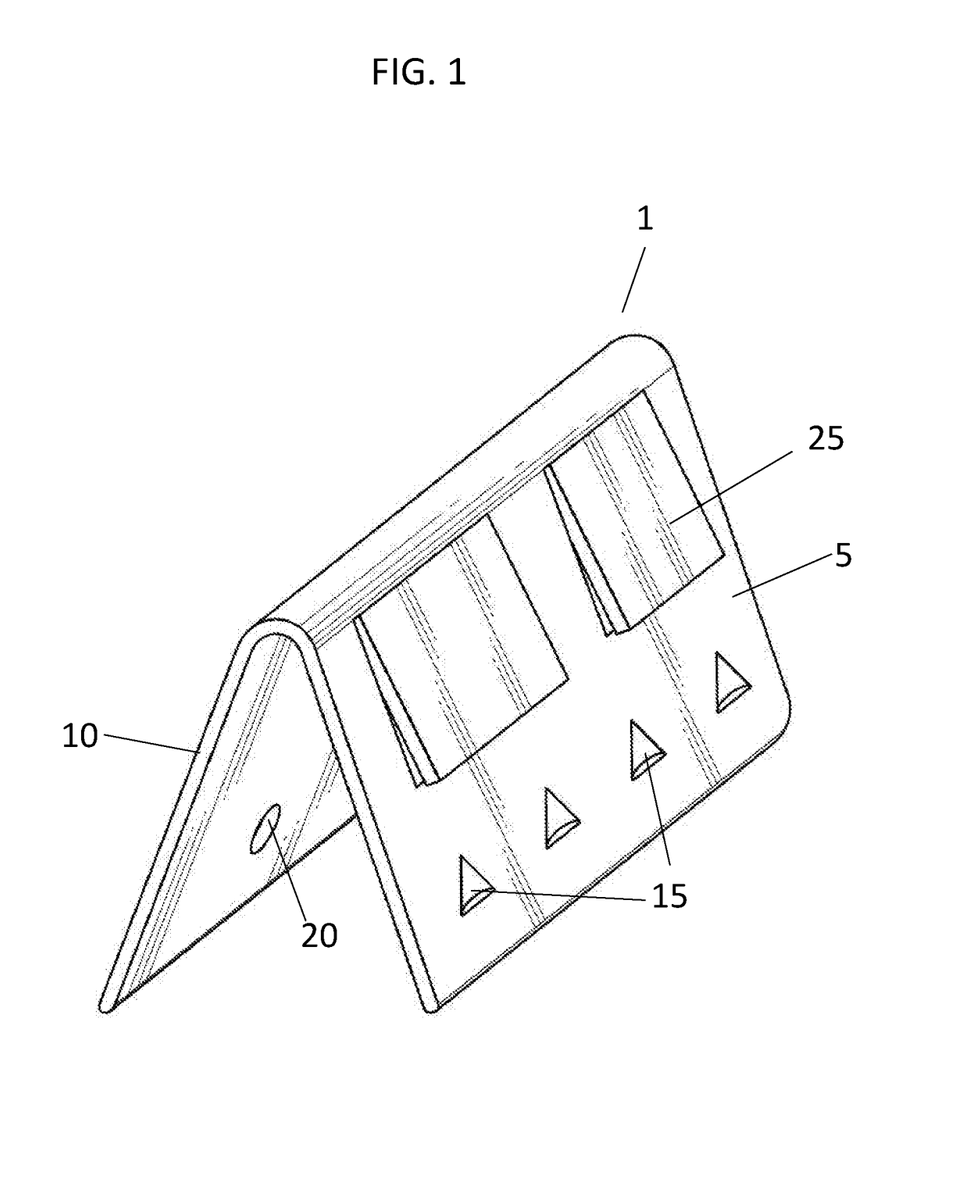
FIG. 1 is a perspective view of the furniture strap clip, according to an embodiment of the present invention.
Figure 2:
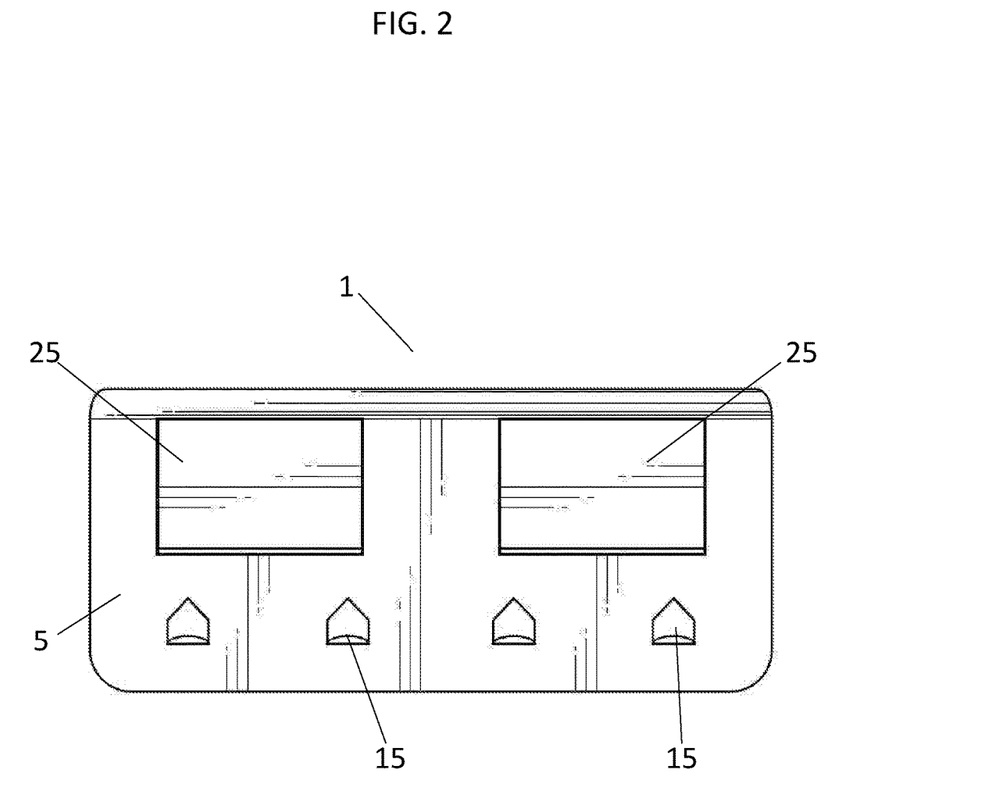
FIG. 2 is a front elevational view of the furniture strap clip, according to an embodiment of the present invention.
Figure 3:
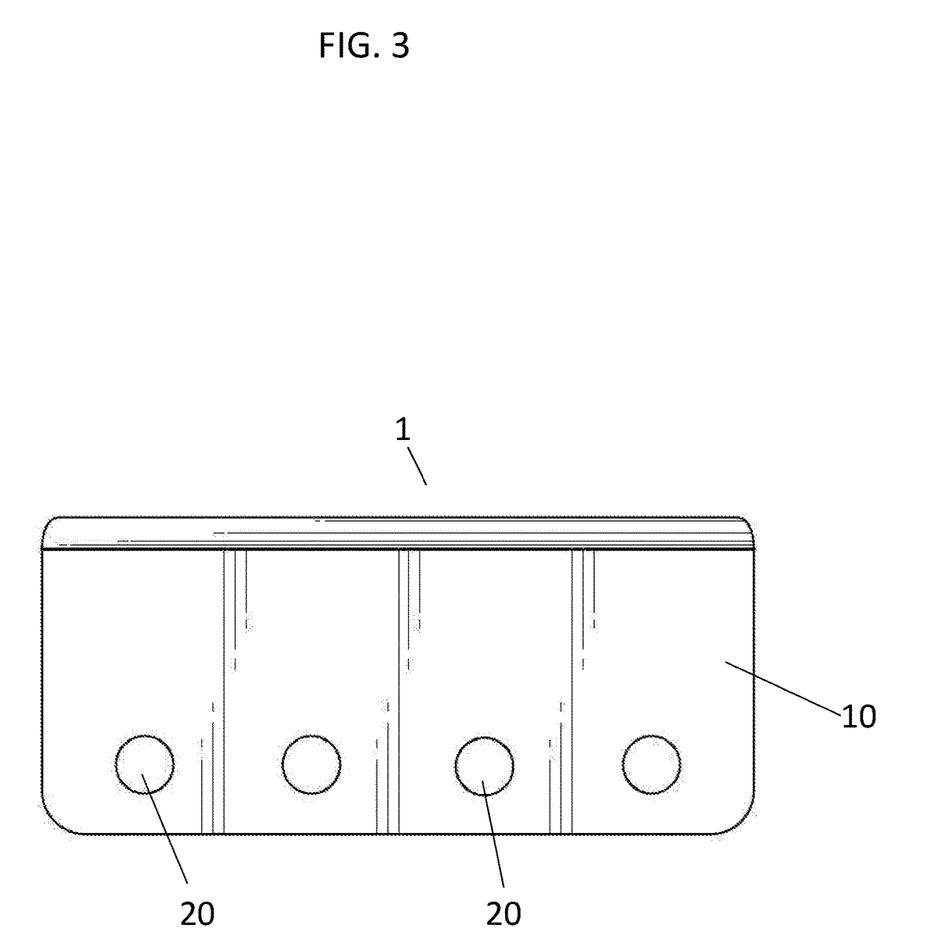
FIG. 3 is a rear elevational view of the furniture strap clip, according to an embodiment of the present invention.
Figure 4:
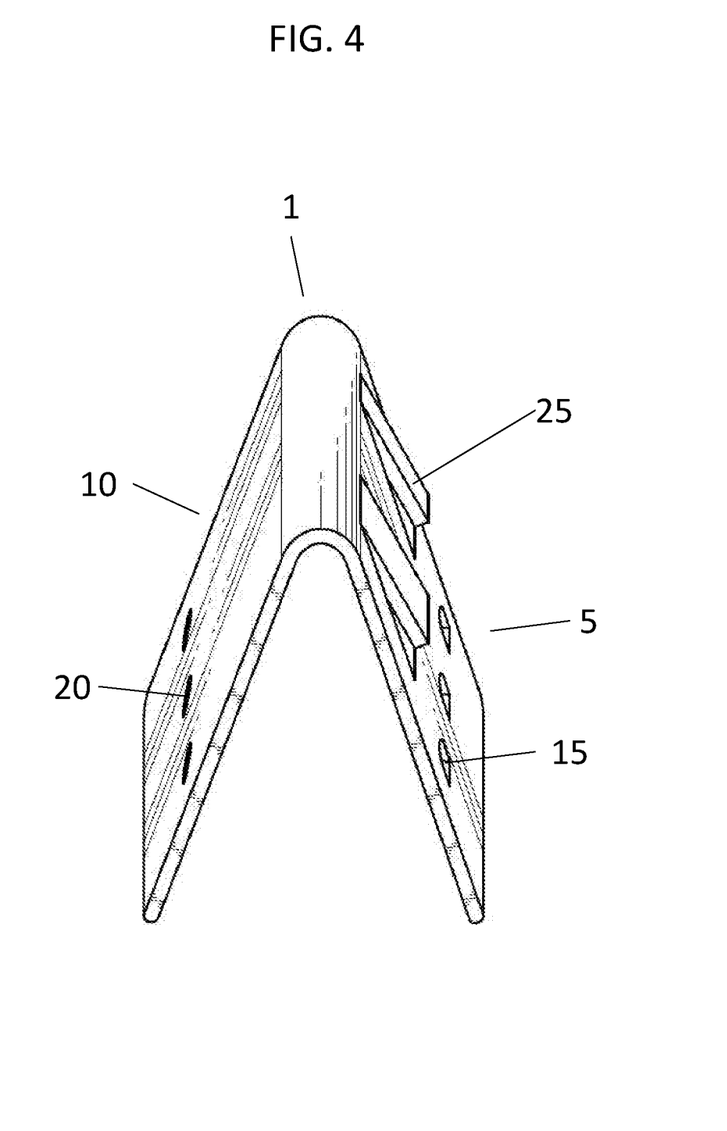
FIG. 4 is a perspective view of the furniture strap clip, according to an embodiment of the present invention.
Figure 5:
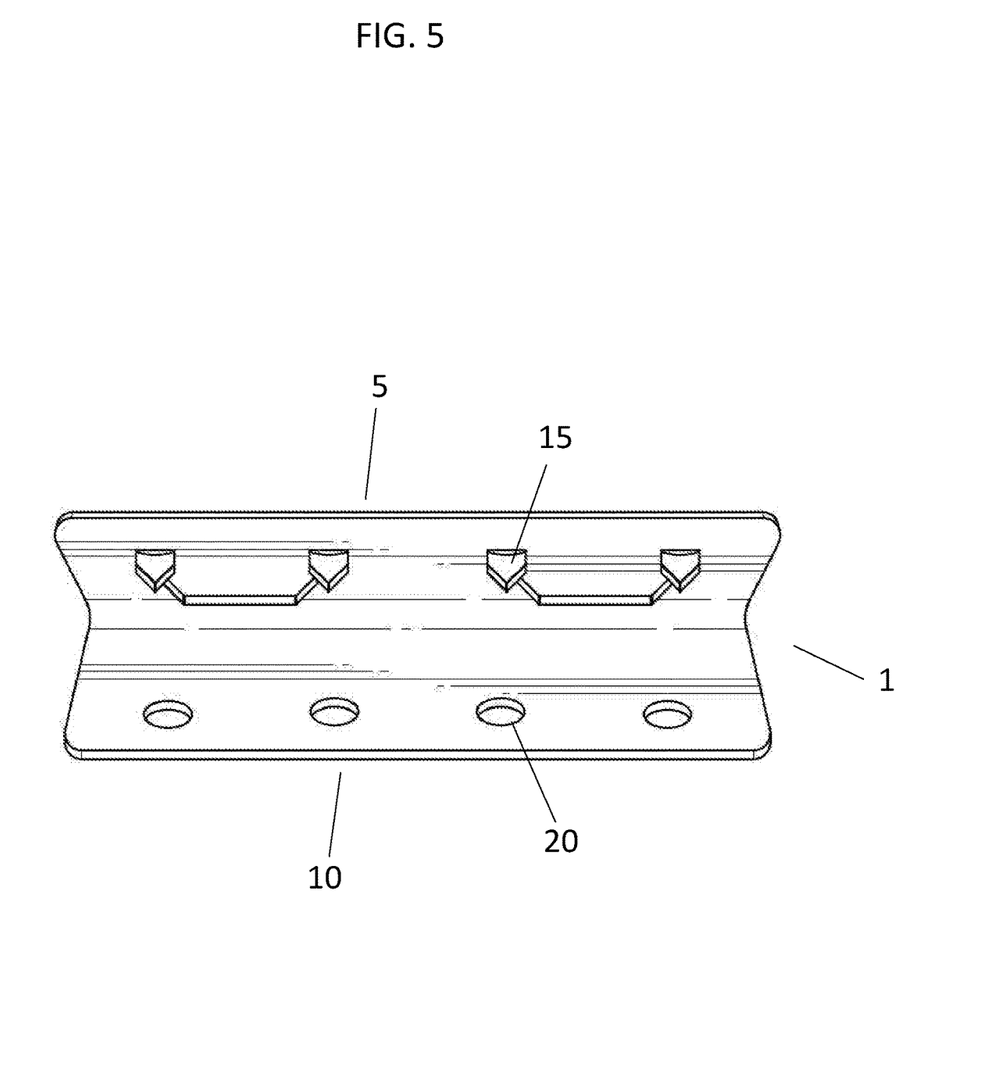
FIG. 5 is a bottom plan view of the furniture strap clip, according to an embodiment of the present invention.
Figure 6:
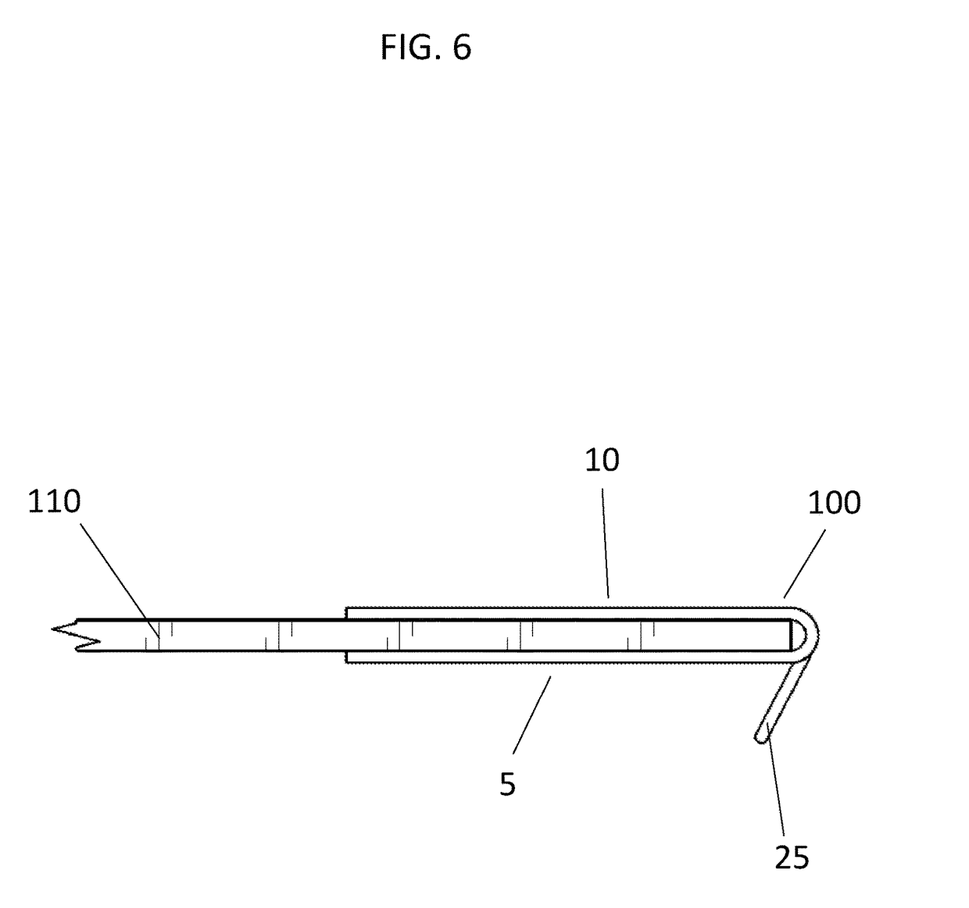
FIG. 6 is a left side elevational view of the furniture strap clip in use, according to an embodiment of the present invention.

In reference to FIG. 6, an embodiment of the furniture strap clip 100 is shown engaging a strap 110, wherein the first side 5 of the clip has been bent towards the second side 10 to clamp the clip 100 upon the strap 110. In the embodiment, the teeth 15 are engaged with the strap 110 to provide retention and securement of the strap 110 within the interior of the clip 100.

Figure 7:
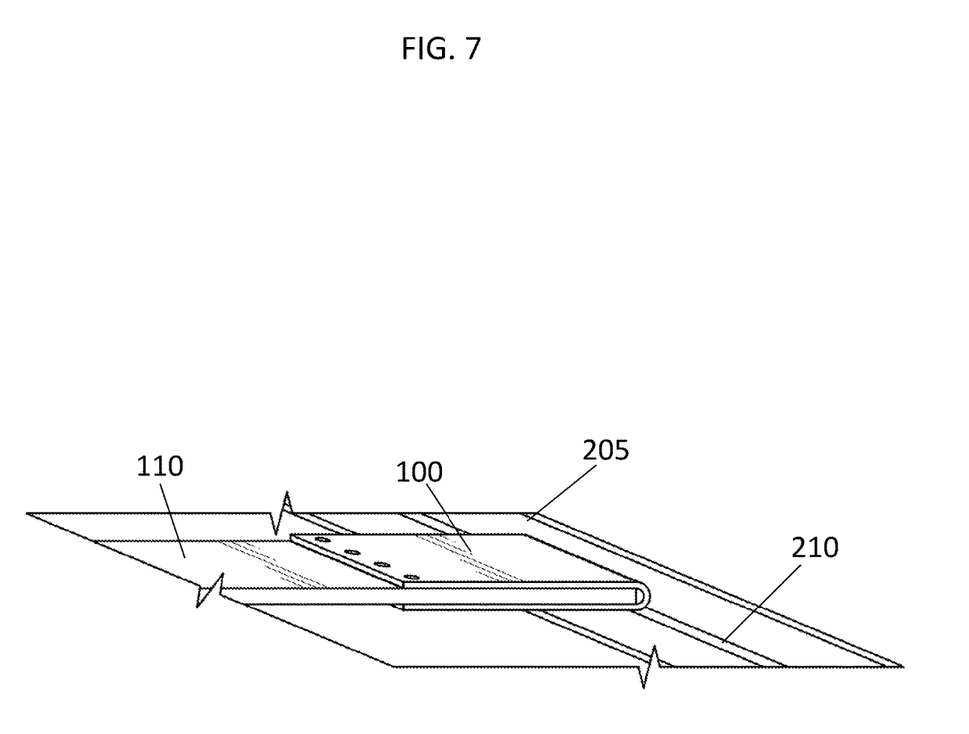
FIG. 7 is a perspective view of the furniture strap clip in use, according to an embodiment of the present invention.

In reference to FIG. 7, the furniture strap clip 100 is shown, wherein the clip 100 has been clamped onto a strap 110. The prongs (not shown) of the clip are inserted into a groove 210 provided within the framework 205 of the article of furniture.

In reference to FIG. 8, a webbing arrangement of multiple straps are shown according to an embodiment of the present invention. In the embodiment, the clips 100 are clamped on to the ends of each strap 110. The prongs (not shown) of the clip 100 are inserted into the grooves 210 provided within the framework 205 of the article of furniture.

FIG. 8 shows the webbing arrangement, wherein the article of furniture is a chair, wherein 6 straps are used in combination with 12 clips to form the webbing system. It would be obvious to one skilled in the art that multiple webbing arrangements could be created using the same clip and strap method. Furthermore, it would be obvious to one skilled in the art to apply a webbing system to a different article of furniture, such as a couch.

Figure 9:
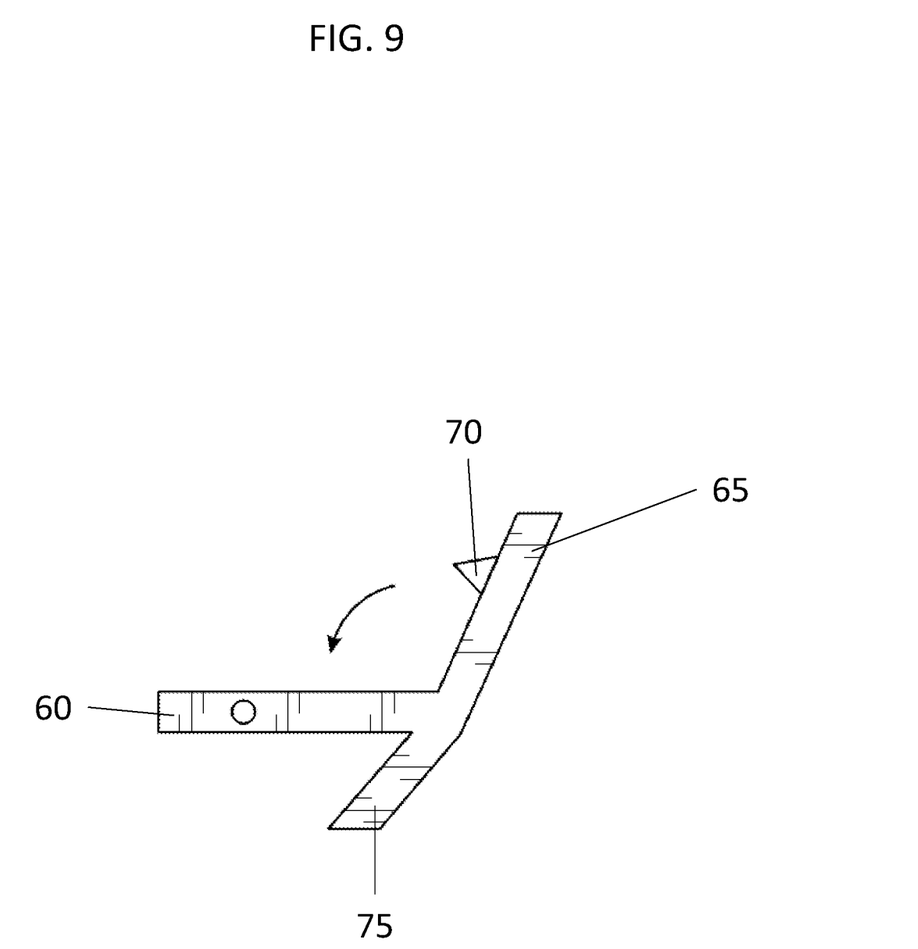
FIG. 9 is a left side elevational view of the furniture strap clip, according to an embodiment of the present invention.

In reference to FIG. 9, a variation of the furniture clip is shown to have a modified T-shape according to an embodiment of the present invention. Wherein, a strap (not shown) may be inserted between the first side 60 of the clip and the second side 65 of the clip. In the embodiment, the second side 65 is bent to the first side 60 such that the teeth 70 engage with a strap to retrain the strap within the clip.

Figure 10:
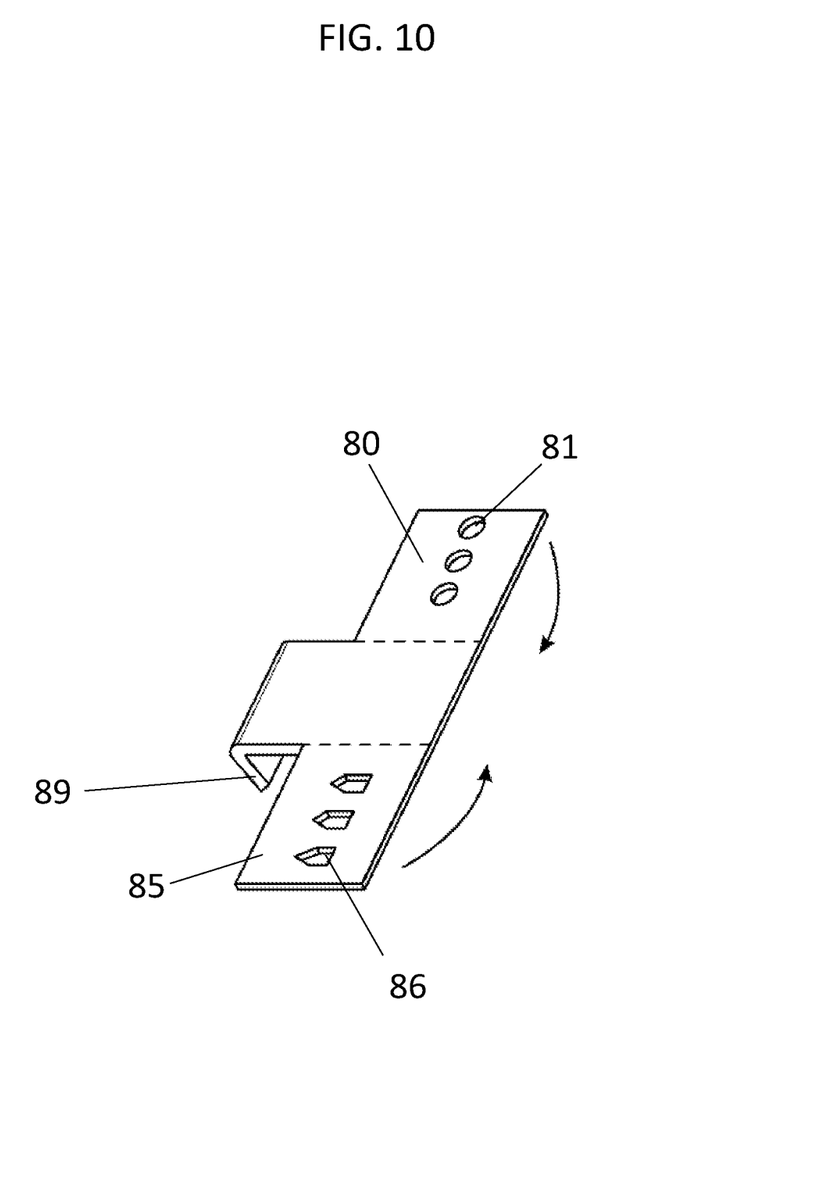
FIG. 10 is a perspective view of the furniture strap clip in use, according to an embodiment of the present invention.

In reference to FIG. 10, a variation of the furniture clip is shown, according to an embodiment of the present invention, having a first foldable side 80 provided with a plurality of through-holes 81, and a second foldable side 85 provided with a plurality of teeth 86. The arrangement is provided to a secure a furniture strap (not shown) by folding the first side 80 over the strap, then folding the strap excess over the folded first side, and then folding the second side onto the strap such that the teeth 86 pierce through the strap and into the through-holes 81. This allows the strap to be retained.

The embodiment is further provided with a one or more prongs 89 to engage within a groove provided in the framework of an article of furniture (not shown). In the embodiment, the strap may also be retained by folding the first side 80 over before inserting the furniture strap, and then folding the second side onto the strap such that the teeth 86 pierce through the strap and into the through-holes 81.

Figure 11:
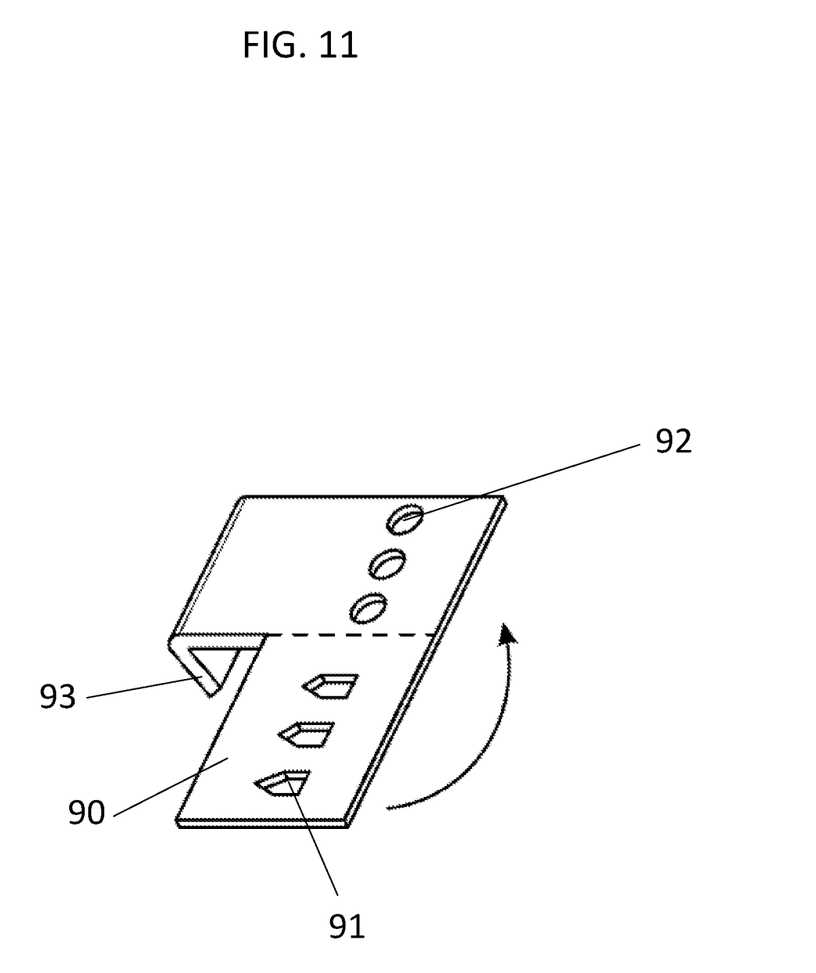
FIG. 11 is a perspective view of the furniture strap clip in use, according to an embodiment of the present invention.

In reference to FIG. 11, a variation of the furniture clip is shown, according to an embodiment of the present invention, having one foldable side 90. The side 90 is provided with a plurality of projections or teeth 91. The clip is further provided with one or more through-holes 92 on the body of the clip. In the embodiment, a furniture strap is placed below the through-holes 92, on the same side as the prong 93, then the side 90 is folded underneath the strap, such that the teeth 91 may pierce the strap and fit into the through-holes 92. The arrangement retains the furniture strap as the prong 93 is inserted into a groove provided on the framework of an article of furniture.

Figure 12:
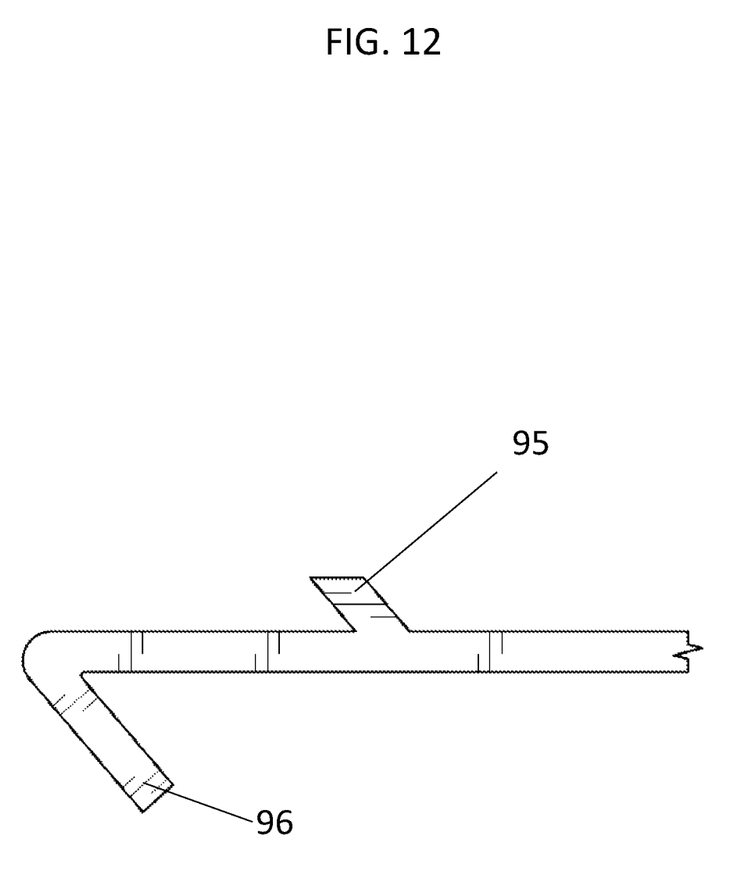
FIG. 12 is a right side elevational view of the furniture strap clip in use, according to an embodiment of the present invention.

In reference to FIG. 12, a variation of the furniture clip is shown, according to an embodiment of the present invention, having a plurality of projections or teeth 95 to pierce and retain a furniture strap (not shown) from a webbing system. In the embodiment, the weight of the user sitting on the webbing system combined with the teeth will retain the strap in the clip. The clip is further provided with one or more prongs 96 to be inserted into a groove on the framework of an article of furniture.

In a preferred embodiment, the clip is comprised of stone-tumbled and galvanized steel, but may also be comprised of any metal, polymeric material, composite material, or another material deemed suitable by one skilled in the art.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A furniture strap clip having:
   a. a first side having a plurality of teeth protruding towards an interior of the clip;
   b. a second side having a plurality of through holes aligned with the plurality of teeth; and
   c. one or more prongs to be inserted into a groove provided on a framework of a workpiece, wherein the interior is defined by a space between the first side and the second side, wherein the first side is bent towards the second side, wherein the plurality of teeth extend through a strap into the plurality of through holes, and wherein the strap is retained by the plurality of teeth.

2. The furniture strap clip of claim 1, wherein the prongs protrude at a 45-degree relative to the first side angle after the first side is bent toward the second side.

3. The furniture strap clip of claim 1, wherein the prongs protrude at a 90-degree relative to the first side angle after the first side is bent toward the second side.

4. The furniture strap clip of claim 1, wherein the clip is metal.

5. The furniture strap clip of claim 4, wherein the metal is steel.

6. A furniture strap clip having:
   a. a plurality of teeth protruding from a first planar surface; and
   b. one or more prongs to be inserted into a groove provided on a framework of an article of furniture, wherein the plurality of teeth extend through a strap to retain the strap as the one or more prongs are inserted into the groove provided on the frame work of the article of furniture.

7. The furniture strap clip of claim 6, wherein the prongs protrude at a 45-degree angle relative to the first planar surface.

8. The furniture strap clip of claim 6, wherein the prongs protrude at a 90-degree angle relative to the first planar surface.

9. The furniture strap clip of claim 6, wherein the clip is metal.

10. The furniture strap clip of claim 9, wherein the metal is steel.

* * * * *